United States Patent [19]

Waller

[11] 3,883,996
[45] May 20, 1975

[54] TREAD GRINDING WHEEL
[75] Inventor: Gustav M. Waller, Geneva, Ill.
[73] Assignee: Amsted Industries Incorporated, Chicago, Ill.
[22] Filed: Jan. 7, 1974
[21] Appl. No.: 431,115

[52] U.S. Cl. .................. 51/206 R; 51/169; 51/372; 51/375
[51] Int. Cl. .............................................. B24b 45/00
[58] Field of Search ...... 51/168, 169, 206 R, 206 P, 51/206 N, 372, 375

[56] References Cited
UNITED STATES PATENTS

| | | | |
|---|---|---|---|
| 1,678,596 | 7/1928 | Howland | 51/375 |
| 1,971,653 | 8/1934 | Levoy et al. | 51/375 |
| 2,083,793 | 6/1937 | Price | 51/372 |
| 3,522,676 | 8/1970 | Miller | 51/206 R |
| 3,646,711 | 3/1972 | Oishi et al. | 51/169 X |
| 3,698,141 | 10/1972 | Landmark et al. | 51/372 |

FOREIGN PATENTS OR APPLICATIONS

| | | | |
|---|---|---|---|
| 1,336,833 | 7/1963 | France | 51/372 |

Primary Examiner—Al Lawrence Smith
Assistant Examiner—K. J. Ramsey
Attorney, Agent, or Firm—Fred P. Kostka; Walter L. Schlegel

[57] ABSTRACT

A tire tread grinding wheel comprising a pair of hub sections having peripheral wedging flanges on which an abrading sleeve is mounted. The hub sections include orientation and aligning means permitting assembly and disassembly of the wheel unit either on or separate from the grinding equipment. The wedging flanges are ground so that the sleeve is forced into true round as the hub segments are drawn into secured relationship.

7 Claims, 2 Drawing Figures

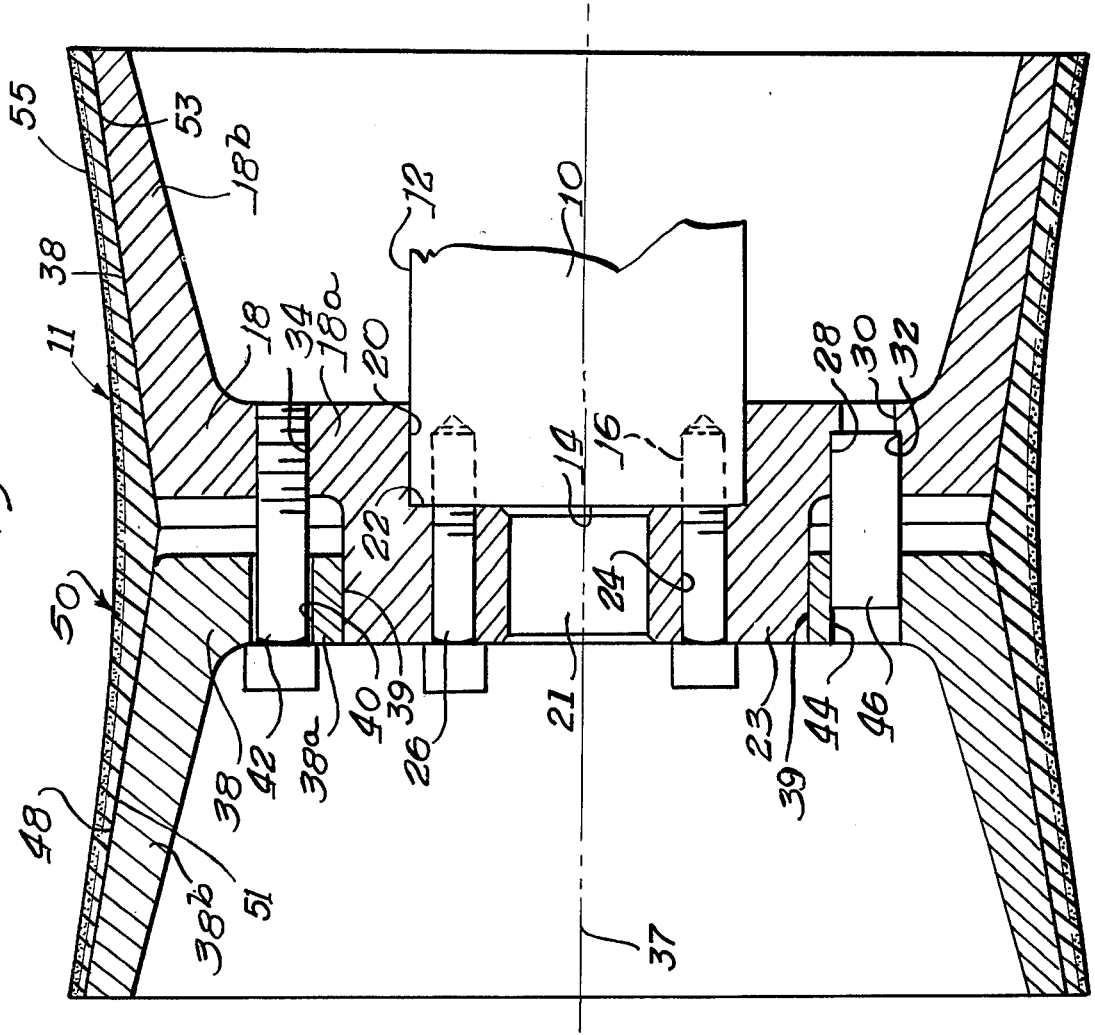
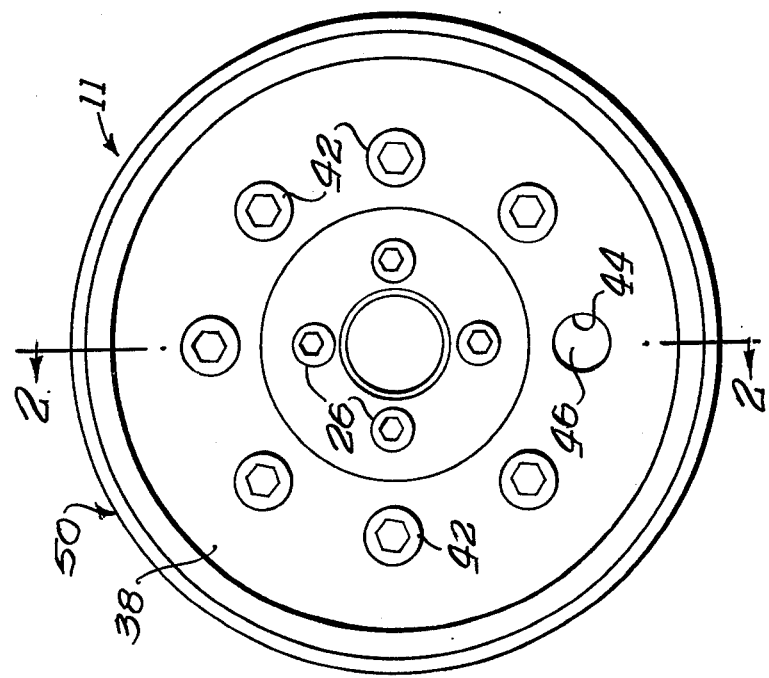

TREAD GRINDING WHEEL

BACKGROUND AND SUMMARY OF THE INVENTION

The balance of tires since the advent of the radial tire has assumed ever greater importance. One method of improving the balance is by grinding the treads to obtain a uniform and constant cross-section through the tire.

Conventional tire grinding wheel equipment has been found unsatisfactory to achieve the precision grinding required. Heretofore, the grinding wheel equipment has generally been constructed with the wheel as an integral unit. These integral grinding wheels must be discarded or reworked in their entirety after the grinding surface becomes worn. Other grinding wheel structures, as exemplified by U.S. Pat. No. 3,698,141, provide replaceable grinding sleeves, but these prior structures have been deficient because the grinding surfaces frequently are out of round. As a result, variations in the depth of grind occurs about the periphery of the tread so that the tire is improperly balanced. Also these out of round wheels cause wear on the grinding equipment itself so that grinding equipment is subject to breakdown.

It is an object of this invention to provide a tread grinding wheel which overcomes the difficulties encountered heretofore and which is of a simple structure and economical to manufacture.

This is accomplished generally by the provision of a grinding wheel assembly comprising a pair of cylindrical hub sections of which one hub section is formed with a boss on which the other hub section is supported and oriented thereon.

Each of the hub sections is formed with oppositely tapered cylindrical flanges of which the respective circumferences are formed so as to be in true round about the axis of rotation of the wheel. A sleeve having an abrading surface is wedgingly retained on the tapered flanges in a true round condition when the hub sections are assembled.

Further features will hereinafter appear.

BRIEF DESCRIPTION OF THE DRAWINGS

FIG. 1 is a front view of grinding wheel assembly incorporating the structure of the present invention.

FIG. 2 is a cross-section, a view taken generally along the lines 2—2 of FIG. 1 showing details of the grinding wheel assembly.

Referring now to the drawings, a shaft 10 connected to a suitable source of power serves to drive a grinding wheel assembly 11 incorporating the structure of the present invention. Shaft 10 has a circumference 12 and an end 14 in which threaded mounting holes 16 are provided.

The improved grinding wheel assembly includes an inner hub section 18 having a circular web 18a and a peripheral flange 18b. Web 18a includes an axial recess 20 having an end surface 22. The recess 20 snugly receives the end 14 of the shaft 10. The web 18a also includes an axially disposed boss 23 having mounting holes 24 which are located complementary to mounting holes 16 in the shaft 10 and receive bolts 26 which rigidly secure the hub section 18 for rotation with the shaft 10. The boss 23 may be formed with an opening 21 for reducing the weight or mass of the web 18.

The web 18a includes an alignment hole 28 formed by counterboring an opening 30 to define a shoulder 32 therein.

The hub section 18 also includes a plurality of angularly spaced, threaded apertures 34 which receive bolts 42 for fastening an outer hub section 38 thereto as more fully to be explained hereinafter.

The flange 18b has a rim or wedging face 36 inwardly tapered, preferably at an angle of about 9°, from the longitudinal axis 37 of shaft 10, as shown in FIG. 2.

An outer hub section 38 includes a circular web 38a having an axial or central opening 39 which receives the boss 23 of the hub section 18. A flange 38b is formed about the periphery of the web 38a. The web 38a is complementary with web 18a so that hub section 18 and 38 define complementary halves of a grinding wheel.

Web 38a includes a plurality of apertures 40 located radially from the opening 39 to align with the threaded apertures 34 in the web 18a. Bolts 42 are threaded in apertures 34 to secure the hub sections 38 and 18.

Web 38 further includes an aperture 44 in alignment with alignment hole 28. A dowel 46 is snugly accommodated within the aperture 44 and hole 28 and seated in abutting relationship with shoulder 32.

The flange 38b includes a rim or wedging face 38 which is sloped upwardly and outwardly at a preferred angle of about 9° with the longitudinal axis of shaft 10.

The two hub sections 18 and 38 are assembled by sliding the boss 23 in the opening 39. In this manner the boss 23 serves as a pilot to maintain axial alignment of the hub sections 18 and 38. Thereafter, the dowel 46 is inserted in the openings 44 and 28 to maintain the hub sections in a predetermined angular orientation. The bolts 42 are then inserted in the aligned opening 40 and threaded aperture 34 to thus secure the sections. When assembled the sections form a rigid grinding wheel having rim or faces 36 and 48 which are tapered in opposite directions and form a generally shallow V-shaped periphery. The rim faces are then precision ground to obtain a true roundness about the longitudinal axis and to assure a taper at the same angle along the entire width of the flanges 18b and 38b. The wheel is also balanced in the assembled condition.

A tread grinding sleeve 50 having an inner circumference is formed to define two surfaces 51 and 53 tapered at about 9° with the horizontal similarly to flange faces 36 and 48 and is securely wedged on the assembled hub sections. The outer circumference 55 of sleeve 50 is formed with radii varying across the width, but these radii are held in true round when the sleeve is mounted on the flange on faces 36 and 48 and when the wheel, as a unit, is secured in the assembled condition as more fully to be explained hereinafter. The outer circumference is provided with an abrasive surface 55 made from a tungsten carbide grit which is attached as by brazing.

The widthwise radii or the contour of the outer surface of sleeve 50 may be varied depending on the contour of the tire tread to be ground.

The entire grinding wheel assembly 11 may be preassembled as noted above, and then secured to shaft 10 by mounting bolts 26. Alternately, or when replacement of sleeve 50 is required, hub 18 may be initially secured to shaft 10 and the sleeve 50 is supported on the boss 23. Thereafter, the hub 38 is slipped over the boss 23 and secured to the hub 18 by the bolts 42. As the bolts 42 are tightened the tapered wedging surfaces 38 and 48 are operative to wedge against the complementary surfaces 51 and 53 on the sleeve 50 and wedge the sleeve on the hubs 18 and 38.

The hubs may be made of low carbon alloy steel and chrome plated after grinding to insure hardness. It is anticipated that the grinding wheels will be used at speeds of up to 5600 RPM, which would provide a minimum of 17,000 surface feet per minute. At this point the dissipation of heat is not a significant problem, as the low carbon content insures adequate dissipation.

The grinding wheel as provided herein permits the grinding sleeve to be replaced as needed without the necessity of discarding or re-grinding and re-balancing the hubs. Replacement of grinding sleeves is easily accomplished without requiring the removal of hub 18 from shaft 10. This is accomplished simply by removal of hub 38 from hub 18.

Re-assembly of the two hub sections is accomplished by fitting the opening 39 of the hub 38 over the boss 23 of the hub 18 and aligning the hubs 18 and 38 by means of the dowel 46. This assures that the hub sections 18 and 38 are maintained properly balanced. The sleeve 50 is applied on the hub section 18 or 38 prior to assembly of the hubs. The fastening bolts 42 are threaded down to draw the hub sections together. Sufficient force is applied to wedgingly retain the sleeve 50 on the flanges 18b and 38b to thereby secure the sleeve 50 on the flanges 18b and 38b. It is to be noted that the bolts 42 are located in close proximity to the flanges 18b and 38b so that the drawing action is effectively applied on the flanges and the possibility of slippage on the wedging surfaces 51 and 53 is minimized. At the same time the flanges 18b and 38b which have been ground to a true round also serve to remove any out-of-roundness which may be present in the sleeve 50 such as that caused by brazing the abrasive grit on the sleeve. In this manner, the outer abrading surface 55 is maintained in true round about the longitudinal axis. Thus, the wheel is in truly circular or true round configuration about the axis of rotation even after replacement of grinding sleeve 50.

Although a preferred form of the invention is disclosed herein, it should be understood that variations and modifications may be made without departing from the scope of the invention as hereinafter claimed.

What is claimed is:

1. A grinding wheel assembly for a tire tread grinding apparatus having a drive shaft, said grinding wheel assembly comprising a first hub section, first fastening means for directly fastening said first hub section to the drive shaft for rotation therewith, a second hub section, second fastening means for fastening said second hub section only to said first hub section, each of said fastening means being exposed and accessible for independent disassembly, complementary aligning and orientating means for axially aligning and angularly orienting said first and second hub sections thereby to maintain said hub sections in the same alignment and orientation upon re-assembly of said hub sections after said hub sections are dis-assembled, said hub sections each having oppositely directed peripheral flanges having taper wedging surfaces, said tapered wedging surfaces being formed to provide a circumference in true round about the axis of rotation of the drive shaft, and sleeve means having a circumferential abrading surface, said sleeve means being secured on said hub sections for rotation therewith with said abrading surface in a true round about the axis of rotation when said fastening means are drawn tight to fasten said first section and second sections.

2. The invention as defined in claim 1 wherein said aligning means comprises an axial boss on said first hub section and an axial opening on said second hub section in which said boss is received.

3. The invention as defined in claim 1 wherein said angular orientation means comprises a dowel seated in complementary aligned openings formed in said first and second hub sections.

4. The invention as defined in claim 3 wherein said second fastening means is radially spaced from said axial boss.

5. The invention as defined in claim 4 wherein said first fastening means for fastening said first hub section to the drive shaft extend through said boss.

6. The invention as defined in claim 4 wherein the inside circumference of said sleeve is tapered complementary to the taper of said flanges.

7. The invention as defined in claim 6 wherein said taper of said flanges converges at an angle of about 9° with the longitudinal axis of the wheel.

* * * * *